United States Patent
Chu

(10) Patent No.: US 7,505,782 B2
(45) Date of Patent: Mar. 17, 2009

(54) IMAGE TRANSMISSION APPARATUS AND METHOD USING CDMA COMMUNICATION NETWORK

(75) Inventor: Gil-Hwoan Chu, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 1068 days.

(21) Appl. No.: 10/739,276

(22) Filed: Dec. 19, 2003

(65) Prior Publication Data
US 2004/0174429 A1    Sep. 9, 2004

(30) Foreign Application Priority Data
Mar. 5, 2003  (KR)  ............... 10-2003-0013818

(51) Int. Cl.
H04B 1/38  (2006.01)

(52) U.S. Cl. ........... 455/550.1; 348/14.02; 370/352; 382/181

(58) Field of Classification Search ............ 370/352; 382/181; 345/168; 348/211.3, 14.02; 455/550.1
See application file for complete search history.

(56) References Cited

U.S. PATENT DOCUMENTS 6,882,859 B1 *  4/2005  Rao et al. ............... 455/550.1
7,092,568 B2 *  8/2006  Eaton ...................... 382/181
2002/0158970 A1 * 10/2002  Takeshi .................. 348/211.3
2003/0197685 A1 * 10/2003  Yi ............................ 345/168

FOREIGN PATENT DOCUMENTS

EP       1 246 293      10/2002
WO     03/005717        1/2003

OTHER PUBLICATIONS

Soares, L.D., et al., "Influence of Encoder Parameters on the Decoded Video Quality for MPEG-4 Over W-CDMA Mobile Networks", Proceedings 2000 International Conference on Image Processing, vol. 2, Sep. 10, 2000, pp. 148-151.

* cited by examiner

Primary Examiner—Gerald Gauthier
(74) Attorney, Agent, or Firm—Roylance, Abrams, Berdo & Goodman, L.L.P.

(57) ABSTRACT

An image transmission apparatus and method using a CDMA communication network are disclosed. The apparatus for transmitting an image captured by a camera to a wireless terminal of a user by means of a mobile communication network, includes an image input unit for receiving an image signal from outside, an image conversion unit for converting an image outputted from the image input unit into a form receivable by the wireless terminal, and a wireless data transmission/reception unit for receiving an image request signal, restructuring the signal outputted from the image conversion unit into a small packet unit and transmitting the packet to the terminal of the user. By transmitting the image data in small packet units instead of transmitting it at once, the image data can be transmitted even with a CDMA wireless modem of a small capacity.

17 Claims, 5 Drawing Sheets

FIG. 4

| START CODE | PHONE NUMBER OF RECEPTION SIDE | CONTROL COMMAND | IMAGE SIZE SUPPORTED | IMAGE TYPE SUPPORTED | END CODE |
|---|---|---|---|---|---|
| SM1 | SM2 | SM3 | SM4 | SM5 | SM6 |

FIG. 5A

| START CODE | PHONE NUMBER OF TRANSMISSION SIDE | ENTIRE NUMBER OF PACKET | ENTIRE VIDEO SIZE | PACKET NUMBER | IMAGE DATA | ERROR CHECK CODE | END CODE |
|---|---|---|---|---|---|---|---|
| VD1 | VHD1 | VHD2 | VHD3 | VD3 | VD4 | VD5 | VD6 |

VD2 spans VHD1–VHD3

FIG. 5B

| START CODE | PHONE NUMBER OF TRANSMISSION SIDE | ENTIRE NUMBER OF PACKET | PACKET NUMBER | DATA RECEPTION STATE | ERROR CHECK CODE | END CODE |
|---|---|---|---|---|---|---|
| RD1 | RHD1 | RHD2 | RD3 | RD4 | RD5 | RD6 |

RD2 spans RHD1–RHD2

IMAGE TRANSMISSION APPARATUS AND METHOD USING CDMA COMMUNICATION NETWORK

CLAIM FOR PRIORITY

This application claims the benefit under 35 U.S.C. §119 (a) of Korean Patent Application No. 2003-13818, the contents of which are hereby incorporated by reference in their entirety.

BACKGROUND OF THE INVENTION

1. Field of the Invention

The present invention relates to a method and apparatus for converting an image captured by a camera into a digital signal, then transmitting the converted digital signal via a network, such as a code division multiple access (CDMA) network, for display on screens of portable wireless terminals such as cell phones or PDA's. The present invention also enables users to monitor the image captured by a camera through a wireless device from a remote place.

2. Description of the Related Art

As is generally known in the art, in sending a message through a conventional mobile communication system, a short message is entered into a mobile communication terminal or a web site, and the message is then transmitted to a messaging server providing a mobile communication service. The transmitted message is stored in a message storage space of a receiver, and if the fact that the message has arrived is notified to the receiver through a mobile communication network, the receiver enables a call path to be set between the messaging server and the receiver's wireless terminal. Accordingly, the receiver can receive the short message. Further, a motion picture may be sent or received through a system capable of supporting a messaging service. The performance and screen display functions of wireless terminals such as cell phones and PDAs have been improved. Also, wireless terminals have been utilized for various purposes. Additionally, since images may be converted, compressed and transmitted in a remote digital image method by means of cell phones or PDAs, users can monitor an image captured by a camera installed in a remote place, by means of the wireless terminals.

A conventional messaging service system is shown in FIG. 1. The messaging service system includes a sender's computer 10, a messaging system 20, a mobile communication terminal 30, conventional mobile communication equipment and web servers 60, 70. The messaging center web server 60 includes web servers for managing web sites providing motion picture messaging service through the Internet. The sender's computer 10 connects with the messaging center web server 60 through a web browser 11, and may go through steps such as member registration and authentication, and so on. In this case, by means of an implied or expressed method, users receive a URL directing them to receive a plug-in such as Active-X of the Microsoft Co., Ltd or Java through the web server 60, which are programs that enable the motion picture messaging service, and the users download the plug-in and install it on the computer. As is known in the art, such plug-ins may exist in many locations on the Internet, and the plug-in is shown as a plug-in web server 70 included in the messaging system 20 in FIG. 1.

Also, the sender's computer 10 includes a microphone 17 for inputting a voice signal, a sound card or voice processing card 15, a camera 18 for inputting a motion picture and a camera interface 16 such as a USB port. A motion picture processing module 14 preferably performs a decimation process on color image data and also preferably reduces the resolution of the color image. Further, the motion picture processing module 14 preferably converts the color image data into a gray image with either two gradation values or four gradation values, then performs an additional signal compression processing. A voice processing module 13 receives voice data from a device driver of the sound card or voice processing card 15, and encodes the voice data with a compression algorithm which can be decoded with a voice codec selected for a general voice call of a mobile communication terminal. The motion picture and voice signals processed as described above are converted into motion picture message information, which is a data packet having a predetermined size, together with control information such as control data for a receiver's phone number and a lip sync, for reproducing the motion picture and voice signal. Then, the motion picture and voice signal is transmitted to a motion picture message server 21 through a plug-in control module.

The messaging system 20 includes a messaging server 22 called a SMS center and a gateway 23 called IWF (interworking function). A mobile communication network 40 is a well-known system component or is very similar to existing messaging systems. The motion picture message server 21 stores a predetermined size of motion picture message information in memory spaces divided according to receivers. The motion picture message server 21 requests that a typical messaging server 22 notify an arrival of such a motion picture message to the mobile communication terminal 30 of a receiver. Further, the motion picture message server 21 transmits the motion picture message information through user identification, when the receiver, who receives such a requirement, sets a call path. The messaging server 22 may utilize the existing SMS. According to the SMS method, a user recognizes whether a message is arrived or not, through a beep, or other notification, and sets a call of a data mode between the motion picture message server 21 and the mobile communication terminal 30 by pressing an appropriate selection button. Next, the user selects a predetermined message from among a given list, and receives the information corresponding to the selected information from the motion picture message server 21.

The mobile communication terminal 30 includes a call circuit 31 including a voice demodulation module 32, a display 33, a display circuit 34 and a messaging service module 35, and is a well-known type of terminal or is one similar to such That is, when a message is received by means of the call circuit 31, the messaging service module 35 receives the message. Voice information from the received message is demodulated by means of the voice demodulation module 32, thereby enabling the demodulated voice information to be outputted to a speaker. Further, the messaging service module circuit 35 enables motion picture information from among the demodulated messages to be demodulated by means of a motion picture demodulation module 36. The demodulated motion picture information is written in the display memory of the display 33 by frame, through the display circuit 34, thereby enabling the motion picture information to be reproduced.

FIG. 2 is a flow chart illustrating a transmitting and receiving method of a motion picture message by means of the aforementioned construction. The sender's computer 10 is connected, by means of an operation by a user who would like to transit the motion picture message, to the messaging center web server 60 providing motion picture messaging service (step S51). The messaging center web server 60 may exist anywhere on the Internet, or may be provided by a plurality of service providers. The sender's computer 10 is connected to a plug-in web server 70 existing at a predetermined address on the Internet through an expressed or implied method, by means of commands encoded on a web page of the messaging center web server 60, so as to utilize a motion picture messaging service initially, and downloads a plug-in control module 12 such as Active-X control of the Microsoft Co., Ltd, which can support the motion picture messaging service (step S52). Then, the user enables a motion picture to be recorded through a camera 18 and a microphone 17 installed on the sender's computer 10 (step S53). The recorded motion picture is transmitted to the motion picture message server 21.

The motion picture message server 21 may physically be the same server as the messaging center web server 60 or a plurality of motion picture message servers 21 may exist. The motion picture message server 21 divides a memory space into a plurality of spaces according to receivers, and stores the message for a predetermined period such as one month (step S54). Then, the motion picture message server 21 requests that the messaging server 22, which provides a typical messaging service, notify an arrival of the message. The messaging server 22 notifies the fact that the message has arrived to a receiver through the mobile communication network 40, according to messaging protocols such as SMS, ISMS and WAP (step S55). However, since the mobile communication terminal 30 does not have sufficient memory, it receives shortened arrival notification information, rather than the entire motion picture message (step S56). Accordingly, in order to receive a entire message, the mobile communication terminal 30 is connected to the messaging server in a data communication mode through the mobile communication network (step S57), and then receives the motion picture message (step S58) and reproduces it frame by fame.

However, in transmitting the motion picture message information, the message may be transmitted by the entire message or by individual image frames. When the motion picture message information is transmitted by message, a selected entire message is downloaded while a communication channel is open. Also, the mobile communication terminal 30 stores the downloaded motion picture message information in a memory, and then obtains access to the memory, thereby reproducing the motion picture message information. Accordingly, this method is problematic in that sufficient memory space needs to be provided in the mobile communication terminal.

The method of transmitting the motion picture message information by image frames is applicable when the memory capacity of a mobile communication terminal is insufficient and a condition of a call path is relatively good. Within the limit of a bandwidth of a wireless communication, a server transmits a selected message by fame, and a reception side receives the selected message in real time and reproduces the received message. However, the transmission unit is restricted by the conditions of reproduction, such as the bandwidth of the wireless communication and the memory space of the terminal.

Further, comparing to a wire data transmission method, this wireless data transmission method has a strong likelihood of data loss, data transmutation and transmission errors occuring. Further, as the amount of data to be transmitted grows larger, the likelihood that such errors will occur becomes higher.

SUMMARY OF THE INVENTION

The above described disadvantages are overcome and other advantages are realized in an apparatus and method according to an embodiemtn of the present invention. An image transmission apparatus for transmitting an image captured by a camera to a wireless terminal of a use via a mobile communication network comprises an image input unit adapted to receive an image signal. The apparatus further comprises an image conversion unit for converting an image received from the image input unit into a form receivable by a wireless terminal. The apparatus further includes a wireless data unit adapted to restructure the image data received from the image input unit, into at least one small packet unit, and to transmit the at least one small packet unit to the terminal of a user. The wireless data unit is preferably capable of tranmitting and receiving over a CDMA network. The packet size is preferably less than 1 kb.

A method according to an embodiment of the present invention comprises receiving an image signal, comverting the image signal into a form which is receivable by the wireless terminal, and restructureing the converted image signal into at least one small packet unit. The method further includes the step of transmitting the at least one small packet unit to the terminal of a user. The method preferably includes the step of receiving an image request signal, and performing the restructuring step based on the received image request signal.

BRIEF DESCRIPTION OF THE DRAWINGS

The above and other objects, features and advantages of the present invention will be more apparent from the following detailed description taken in conjunction with the accompanying drawing figures, in which:

FIG. 4 is a view showing a packet structure of a short message according to an embodiment of the present invention;

FIG. 5A is a view showing a packet structure for transmitting an image data according to an embodiment of the present invention;

FIG. 5B is a view showing a packet structure for notifying of a result after receiving the image data according to an embodiment of the present invention.

In the drawing figures like reference numerals will be understood to refer to like features and structures.

DETAILED DESCRIPTION OF THE PREFERRED EMBODIMENTS

Hereinafter, an embodiment of the present invention will be described with reference to the accompanying drawing figures.

Figure 1:
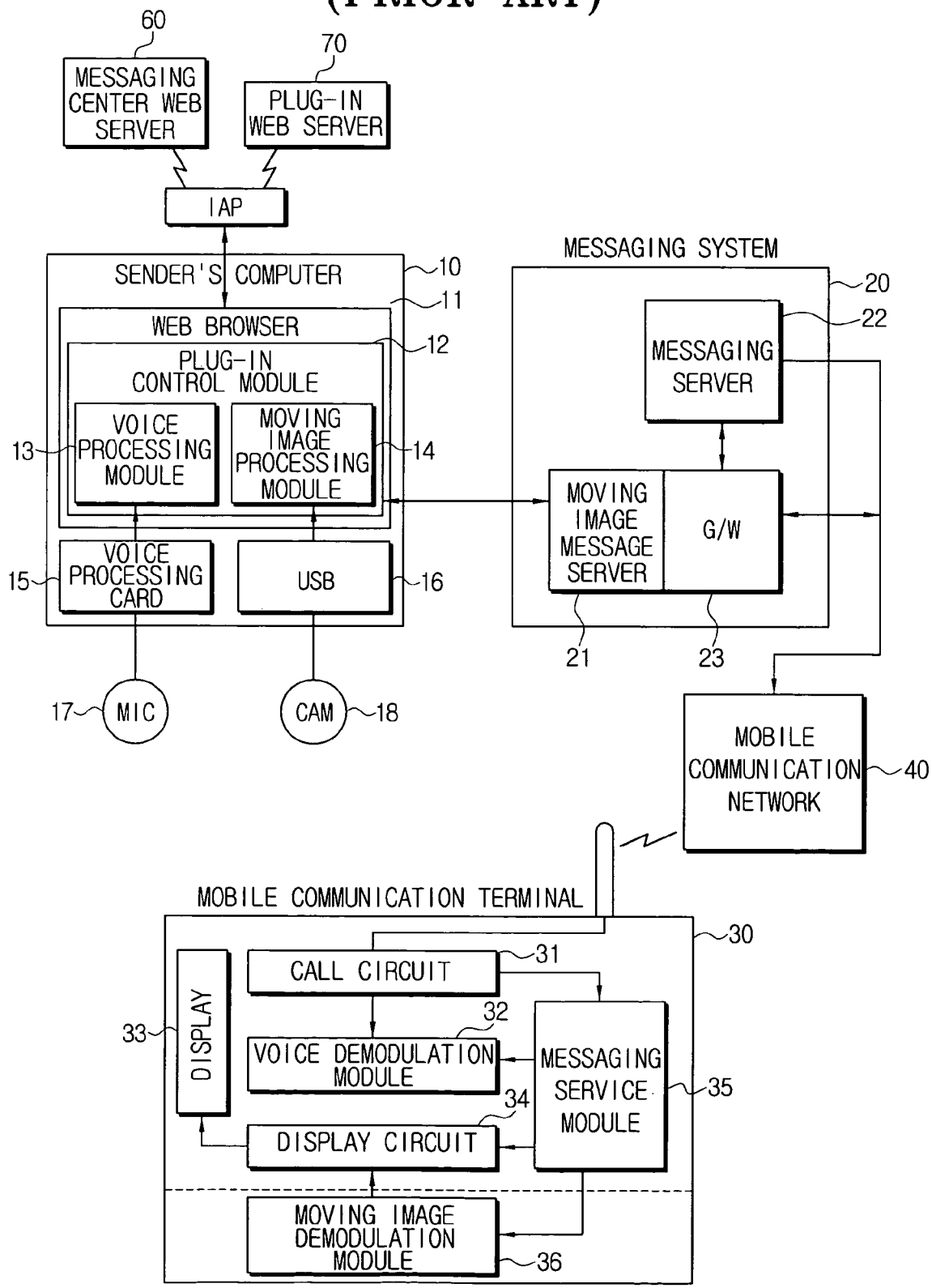
FIG. 1 is a conventional messaging service system.
Figure 2:
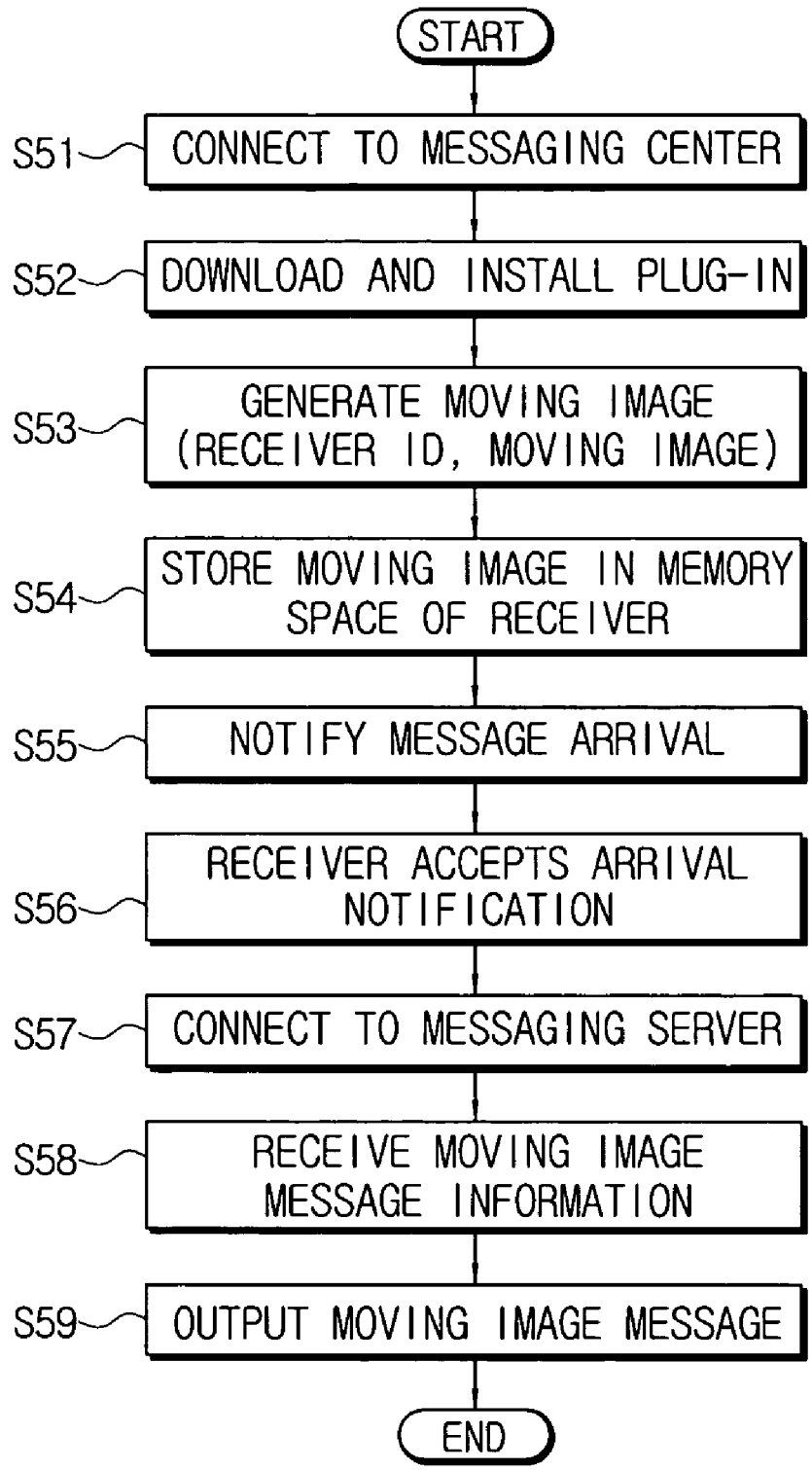
FIG. 2 is a flow chart illustrating a conventional transmitting and receiving method of a motion picture message.
Figure 3:
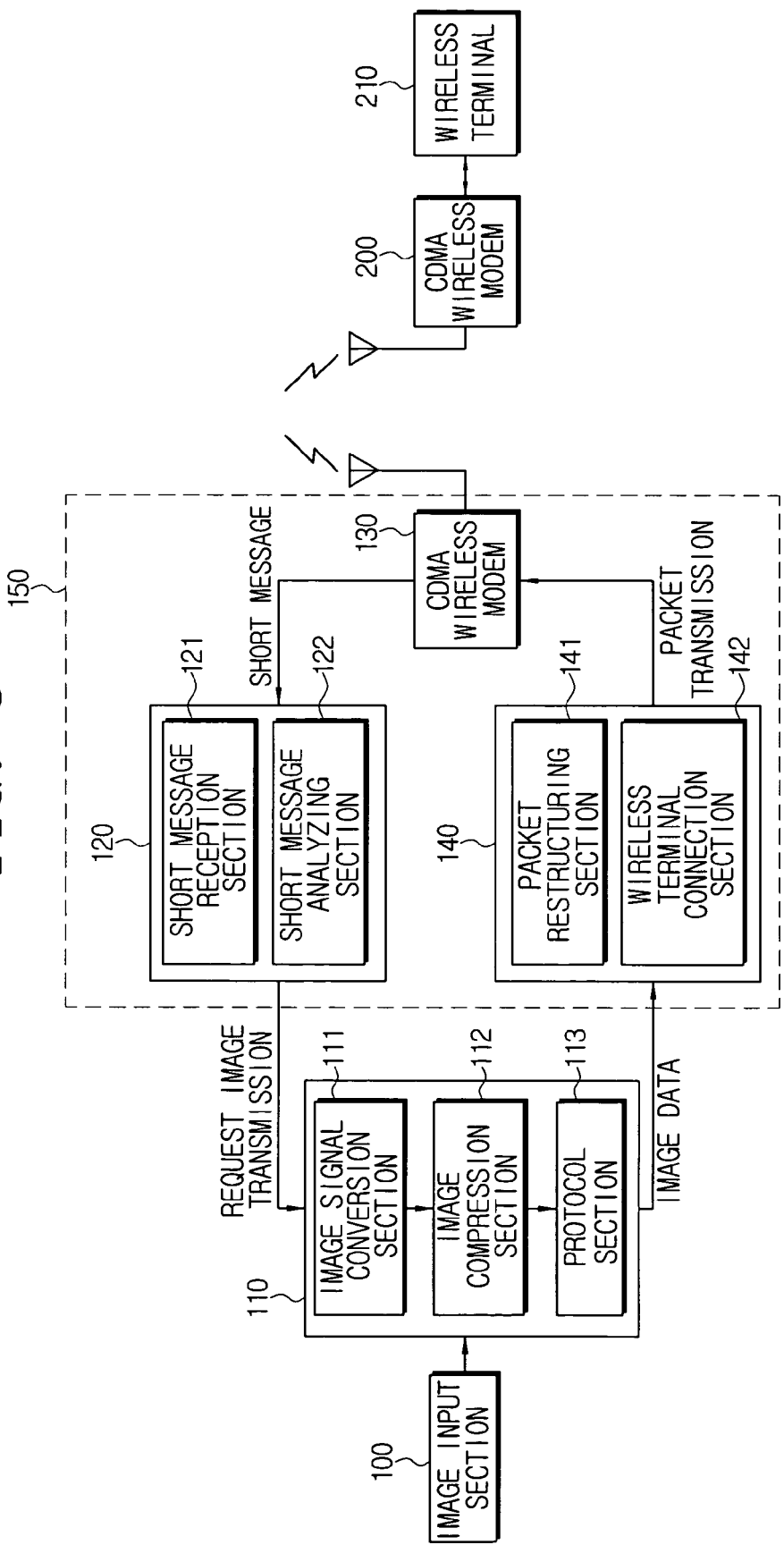
FIG. 3 is a schematic block diagram of a data transmission/reception apparatus according to an embodiment of the present invention, which utilizes a mobile communication network.

FIG. 3 is a schematic block diagram of a data transmission/reception apparatus according to an embodiment of the present invention, which utilizes a mobile communication network. As shown in FIG. 3, the data transmission/reception apparatus according to an embodiment of the present invention for transmitting an image from a camera to a wireless terminal of a user by means of the mobile communication network includes an image transmission unit and an image reception unit. The image transmission unit includes an image input unit 100, an image conversion unit 110 and a wireless data transmission/reception unit 150. The image reception unit includes a CDMA wireless modem 200 and a wireless terminal 210 of the user.

The image input unit 100 receives an analog image signal inputted from an outside camera, and outputs the signal to the image conversion unit 110. The image conversion unit 110 receives an image transmission request signal from the wireless data transmission/reception unit 150, for converting the inputted image signal into an image data, which can be received by the wireless terminal, then outputting the converted image data to the wireless data transmission/reception unit 150.

The wireless data transmission/reception unit 150 receives an image request signal from the wireless terminal of a user, and outputs the image request signal to the image conversion unit 110. Further, the wireless data transmission/reception unit 150 restructures the inputted image data into a small packet unit and transmits the packets to the wireless terminal of the user.

The image conversion unit 110 includes an image signal conversion unit 111, an image compression unit 112 and a protocol section 113. The image signal conversion unit 111 converts the analog signal into a digital signal. The image compression unit 112 converts the converted digital image signal into a signal having a form which can be received by the wireless terminal, and compresses the file size. The protocol section 113 converts the output signal of the image compression unit 112 into image data in the form of a file suitable for the protocol supported by the wireless terminal.

The wireless data transmission/reception unit 150 includes a CDMA wireless modem 130, a short message receiving unit 120 and an image data transmission unit 140. The CDMA wireless modem 130 receives a short message of the wireless terminal 210 transmitted from the CDMA wireless modem 200 of the user side, and transmits the image data outputted from the image conversion unit 110 to the wireless terminal of user. The short message receiving unit 120 extracts the wireless terminal information from the short message outputted from the CDMA wireless modem 130, and transmits the image transmission request signal to the image conversion unit 110. The image data transmission unit 140 receives the image data from the image conversion unit 110, restructures the image data into smaller packet units, and then outputs the packets to the CDMA wireless modem 130.

Further, the short message receiving unit 120 includes a short message reception section 121 and a short message analyzing section 122. The short message reception section 121 receives the short message from the CDMA wireless modem 130. The short message analyzing section 122 extracts the wireless terminal information of the user side from the received short message. The wireless terminal information includes a phone number of the CDMA wireless modem 200, image type information and screen size information, which are supported by the wireless terminal 210.

The image data transmission unit 140 includes a packet restructuring section 141 and a wireless terminal connection section 142. The packet restructuring section 141 restructures the received image data into small packet units, so as to reduce file transmission errors, and so as to improve retransmission efficiency when a transmission error occurs. The wireless terminal connection section 142 outputs the restructured data to the CDMA wireless modem 130.

FIG. 4 is a view showing a packet structure of a short message by which the wireless terminal 210 of the user side requests an image transmission through the CDMA modem 200. The short message for requesting the image transmission includes a start code, a phone number of a reception side, a control command, an image size supported, an image type supported and an end code.

The start code SM1 represents that the received short message is a short message for requesting the image transmission. The phone number SM2 of the reception side represents the phone number of the CDMA wireless modem 200 in the image reception side of user. The control command SM3 may include a first command and a second command. The first command requests that an image captured by a camera should be transmitted to the image reception side. The second command selects a camera, which is to transmit an image, when a number of cameras are installed on the image transmission unit The image size supported SM4 is a code representing a display window size (e.g., 320×240) of the wireless terminal 210, in order to prevent the size of the image from exceeding (being larger than) the display window size. The image type supported SM5 is a code used when the image captured by the camera is compressed according to an image type such as WBMP or JPG or the like, which is supported by the wireless terminal 210 of user. The end code SM6 is a code for identifying of the end of the short message.

That is, the image transmission side which receives the short message for requesting image transmission as described above obtains the phone number of the wireless terminal of a user who requests the image transmission through the start code SM1 and phone number SM2 of the reception side included in the short message. Further, the image transmission side obtains the image transmission request from the user and desired camera information by analyzing the control command SM3. Further, from the image size supported SM4 and the image type supported SM5, the image transmission side extracts size and image type in which the image will be compressed and converted. Further, when the end code SM6 is detected, the image transmission side ends the reception of the short message.

FIG. 5A is a view showing a packet structure including image data transmitted through a CDMA wireless modem. As shown in FIG. 5A, the transmitted packet includes a start code VD1, a data transmission packet header VD2, a packet number VD3, an image data VD4, an error check code VD5 and an end code VD6. Further, the data transmission packet header VD2 includes a phone number VHD1 of the transmission side, an entire number of a packet VHD2 and an entire image size VHD3.

In the above structure, the start code VD1 and the end code VD6 refers to a transmission of the start and end of the image data packet The phone number VHD 1 of the transmission side refers to the phone number of the CDMA wireless modem 130 connected to the transmission side. The entire number of the packet VHD2 refers to a number of the packet unit into which the image data have been restructured The entire image size VHD3 refers to the entire size of the image data. The packet number VD3 refers to the sequence to which a current packet corresponds from among the entire set of packets. Herein, when a mission error has occurred, the packet which has the transmission error can be identified and only that packet needs to be retransmitted by means of the packet number VD3. Accordingly, the image reception unit can recover the entire image by utilizing small packet units. The image data VD4 refers to data for the image captured by the camera. The error check code VD5 is a code for determining whether an error in the image data VD4 has occurred.

FIG. 5B is a view showing a packet structure for notifying a result after receiving the image data. As shown in FIG. 5B, a packet responding to the transmitted image data includes a start code RD1, a data response packet header RD2, a packet number RD3, a data reception state RD4, an error check code RD5 and an end code RD6. Further, the data response packet header RD2 includes a phone number RHD of a reception side, and an entire number of a packet RHD2.

In the above packet structure, the start code RD1 and the end code RD6 refer to a transmission start and end of the response data packet. The phone number RHD 1 of the reception side refers to the phone number of the CDMA wireless modem 200 of the reception side, which sends a response. The entire number of the packet RHD2 refers to the number of small packet units into which the image data has been restructured. The packet number RD3 refers to the sequence of a current packet, which has a reception response, from among the entire set of packets. Herein, when a transmission error has occurred, only the packet having the transmission error needs to be retransmitted by means of the packet number RD3. The data reception state RD4 refers to whether the packet has been received well in the reception unit or not, and whether a transmission error has occurred or not. The error check code RD5 is a code for checking if there is something wrong in the data reception state RD4 or not.

Figure 6:
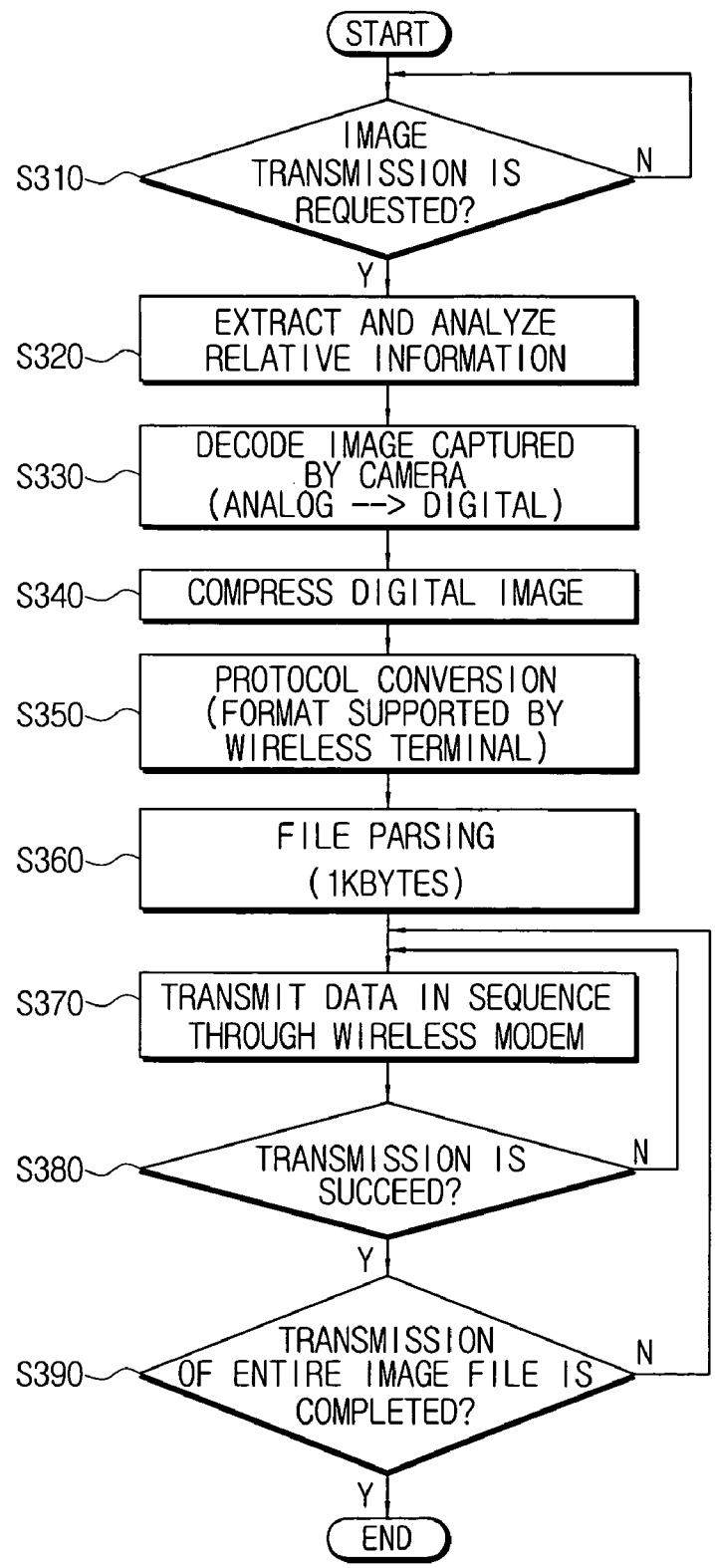
FIG. 6 is a flow chart illustrating an operation of the data transmission/reception apparatus according to an embodiment of the present invention.

Hereinafter, referring to FIG. 6, an operation of the apparatus according to one embodiment of the present invention is described. Fit it is determined whether the image transmission unit has received the image transmission request from the image reception unit or not (step S310). When the image transmission unit has received the image transmission request, the short message receiving unit 120 extracts related data from the received short message, and analyzes the extracted data (step S320). In these steps, several pieces of information, including the phone number of the CDMA wireless modem of the reception side and the image size/type supported by the wireless terminal of the reception side, are extracted from the short message as shown in FIG. 4.

The short message receiving unit 120 outputs the extracted information and the image transmission request signal to the image conversion unit 110. The image conversion unit 110 converts the image and compresses the converted image, so as to output the compressed image to the image data transmission unit 140.

The above-mentioned step will now be described in more detail. The image signal conversion unit 111 of the image conversion unit 110 converts the analog signal inputted from the camera into a digital signal (step S330). On the basis of the extracted relative information, the image compression unit 112 converts the converted digital image signal into a signal having a form which can be received by the wireless terminal, and also compresses the file size (step S340). The protocol section 113 transits image data, which is made in a form of a file suitable for the protocol supported by wireless terminals and is obtained by converting the output signal of the image compression unit 112, to the image data transmission unit 140 (step S350).

The packet restructuring section 141 of the image data transmission unit 140 receives the image data output from the image conversion unit 110, so as to restructure the image data to the packet structure of the transmission image data as shown in FIG. 5A (step 360), thereby sending the packet to the CDMA wireless modem 130 (step S370).

It is preferable that the size of the small packet unit of image data is about 1 kbytes in consideration of the transmission effectiveness and stability.

When data is transmitted between wireless modems, a news agency forcedly cuts off the connection if the communication between the wireless modems has not been performed for a predetermined period of time. In order to transmit a large amount of data, first a wireless modem of a transmission unit must receive the data and then transmit the data to a wireless modem of a reception unit. Accordingly, the news agency cuts off the connection after judging that the communication between the transmission wireless modem and the reception wireless modem has been interrupted, when the wireless modem of the transmission unit has waited for data reception for a long time.

The CDMA wireless modem 130, which has received the image data to be transmitted, transmits a packet including the image data to the image reception unit, and determines whether the transmitted data has been received by the wireless terminal 210 or not (step S380). The data reception state bit RD4 from the packet notifying of a reception result of the image data in FIG. 5B(which is transmitted from the wireless terminal 210 of the image reception unit) is checked. From the result of checking the data reception state bit RD4, when the transmission/reception has been completed, it is determined whether the entire image file has been received or not (step S390). From the determination, when the transmission has been completed, the procedure is ended. In step S380, when the transmission has failed, that is, when the wireless terminal 210 of the image reception unit judges that a transmission error has occurred, the wireless terminal 210 transits the packet number RD3 in which an error has occurred and a message indicating that an error has occurred in the data reception state code RD4 to the image transmission unit. The image reception unit determines whether a transmission error has occurred by comparing the error check code VD5 included in the transmitted image data. Accordingly, the short message receiving unit 120 extracts relative information and enables an image data corresponding to the packet number in which the error has occurred to be retransmitted.

Further, when the transmission has not been completed in step S390, the procedure returns to step S370. Accordingly, data corresponding to the next packet is transmitted.

As described above, according to the image transmission apparatus and method of an embodiment of the present invention, since the image data are not transmitted all at once, but rather are transmitted as small packet units, the image data can be transmitted by means of a CDMA wireless modem having a small capacity. Further, transmission errors due to a wireless transmission/reception can be reduced. Furthermore, when a transmission error has occur since an entire image data are not retransmitted, but only packets having the transmission error are retransmitted, embodiments of the present invention improve transmission effectiveness and stability of the image data.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An image transmission apparatus for transmitting an image captured by a camera to a wireless terminal of a user via a mobile communication network, the apparatus comprising:
    an image input unit adapted to receive an image signal;
    an image conversion unit for converting an image received from the image input unit into a form receivable by the wireless terminal; and
    a wireless data unit adapted to restructure the image received from the image input unit into at least one small packet unit, and to transmit the at least one small packet to the terminal of the user separately;

wherein the wireless data unit is further adapted to receive an image request signal from the wireless terminal of the user and to restructure the image received from the image input unit in response to the received request signal, the image request signal including a requested resolution and a requested image format for the transmitted image.

2. The image transmission apparatus of claim 1, wherein the wireless data unit is further adapted to transmit and receive data.

3. The image transmission apparatus of claim 1, wherein:
the mobile communication network includes a CDMA network; and the wireless data unit transmits the at least one small packet over the CDMA network.

4. The image transmission apparatus of claim 1, wherein the wireless data unit includes a CDMA modem.

5. The image transmission apparatus of claim 1, wherein the small packet unit comprises less than 1 kb of data.

6. An image transmission method for transmitting an image captured by a camera to a wireless terminal of a user via a mobile communication network, the method comprising the steps of:
receiving an image signal;
receiving an image request signal from the wireless terminal of the user including a requested image resolution and a requested image format;
converting the image signal into as form receivable by the wireless terminal based on the image request signal;
restructuring the converted image signal into at least one small packet unit; and
transmitting the at least one small packet to the terminal of the user separately.

7. The image transmission method of claim 6, wherein the transmitting step transmits said at least one small packet over a CDMA network.

8. The image transmission method of claim 6, wherein the transmitting step further comprises transmitting the at least one small packet via a CDMA modem.

9. A method of transmitting an image signal to a wireless terminal of a user over a mobile communication network, comprising the steps of:
receiving an image request signal from a wireless terminal of a user, the image request signal including a requested resolution and a requested image format for the transmitted image signal;
converting an image signal into one of a plurality of predetermined formats based on said image request signal;
packetizing said converted image signal; and
transmitting said packetized image signal over said mobile communication network to said wireless terminal of said user.

10. The method of claim 9, further comprising the step of compressing said converted image signal prior to performing said packetizing step, and wherein the packetizing step packetizes said compressed converted image signal.

11. The method of claim 9, wherein said packetizing step packetizes said converted image signal into packets comprising less than 1 kb of data.

12. A computer readable medium having computer executable instructions stored thereon, the instructions adapted to control an apparatus to request an image to be transmitted to a wireless terminal of a user over a mobile communication network, the request comprising:
a start code;
data representing a phone number of a reception unit;
data representing a control command, adapted to cause an image from a camera to be transmitted to the wireless terminal of the user;
data representing an image size;
data representing an supported image type; and
an end code.

13. The computer readable medium of claim 12, wherein said control command comprises a camera selection command, adapted to select one of a plurality of available cameras.

14. The computer readable medium of claim 12, wherein said image size defines a window size of an image to be transmitted.

15. The computer readable medium of claim 12, wherein said image type comprises JPG and WBMP.

16. A computer readable medium having computer executable instructions stored thereon, the instructions adapted to control an apparatus to transmit image data to a wireless terminal of a user over a mobile communication network, the image data comprising a plurality of packets, each packet comprising:
a start code, a header, a packet number, image data, an error check code, and an end code, and wherein said header comprises data representing a phone number of a receiving unit, a total number of packets to be transmitted, and an entire video size.

17. The computer readable medium of claim 16, wherein said mobile communication network includes a CDMA network, and the signal is transmitted over the CDMA network.

* * * * *